P. A. E. ARMSTRONG.
BEARING.
APPLICATION FILED JUNE 13, 1919.
1,422,812.
Patented July 18, 1922.
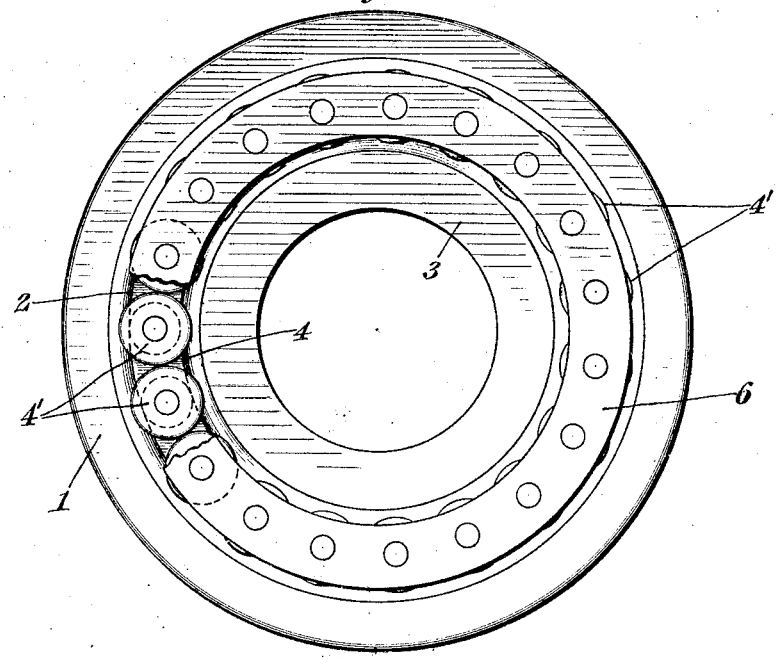
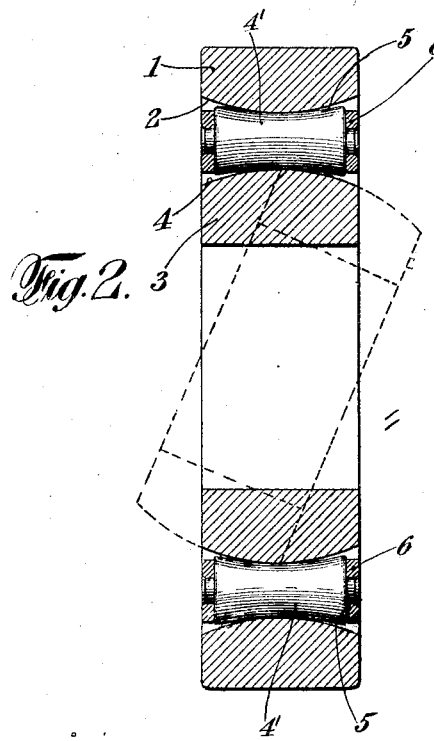
INVENTOR
Percy A. E. Armstrong
BY
Prindle Wright & Small
ATTORNEYS

UNITED STATES PATENT OFFICE.

PERCY A. E. ARMSTRONG, OF WATERVLIET, NEW YORK.

BEARING.

1,422,812.  Specification of Letters Patent.  Patented July 18, 1922.

Application filed June 13, 1919. Serial No. 303,887.

*To all whom it may concern:*

Be it known that I, PERCY A. E. ARMSTRONG, a subject of the King of Great Britain, residing at Watervliet, in the county of Albany and State of New York, have invented a certain new and useful Improvement in Bearings, of which the following is a specification.

My invention relates particularly to bearings which may be used for any desired purpose and in any apparatus in which ball bearings or roller bearings find application.

An object of my invention is to provide roller bearings which are self-alining and which may be readily dismantled for replacements, repairs, etc. To secure this and related ends, the bearing members are provided with convex bearing surfaces, the inner bearing member being formed with spherical bearing surfaces, and the rollers are concave, their surfaces being formed on an arc of larger radius than the radius of the bearing surfaces of the race members.

Further objects of my invention will appear from the detailed description thereof contained hereinafter.

While my invention is capable of embodiment in different forms, for the purpose of illustration I have shown only one form thereof in the accompanying drawings, in which—

Fig. 1 is a side view of a bearing made in accordance with my invention, the cage being partly broken away; and Fig. 2 is a central section of the form of the invention shown in Fig. 1.

The outer race member 1 has an inwardly convexed bearing surface 2 which is transversely curved in an arc of a circle. The inner race member 3 also has a convex bearing surface 4, of spherical contour, so as to provide a self-aligning bearing, which is adapted to be readily assembled and disassembled by tilting of the race members relative to each other, as is indicated in dotted lines in Fig. 2. Between the outer and inner race members 1 and 3 a plurality of rollers 4' are mounted, such rollers having a concave bearing surface 5 which is longitudinally curved in an arc of a circle of larger radius than used in connection with the bearing surfaces 2 and 4 of the race members. A cage 6 is shown in combination with the rollers, but may be dispensed with, if desired. With a bearing constructed as described, what is substantially a point contact is obtained between the rollers and the bearing surfaces 2 and 4, so as to bring about a purely rolling action in the use of the bearing and eliminating the friction losses due to sliding between relatively moving parts.

Accuracy in the manufacture of the bearing may be much more readily obtained with the arrangement described than when concave bearing surfaces and a convex roller surface is employed, for example. It is difficult to measure precisely the dimensions of the bearing surfaces of the race members in case such surfaces are concave, but the convex surfaces may be easily tested with relatively less liability of error. The concave rollers may be readily ground, as from a fixed pivot, and the size of the concave rollers may also be readily determined, so that all parts of the bearing may be quickly and reliably brought to the desired dimensions.

With bearings constructed as described the load supporting surface of the roller is a restricted area near the center of the same. The concave arc on which the surface of the roller is formed at and to a substantial distance on each side of the middle thereof affords a substantial support to the bearing surface, insuring long life and high resistance to wear under load.

While, as stated, the roller is formed on a curvature greater than the curvature of the bearing surfaces, the amount of such difference may vary somewhat. For example, with small high speed bearings, it is desirable to have as far as possible only an actual point contact between each roller and its race, but in the case of large slow speed bearings, it is preferable to have relative curvatures so arranged that when the bearing is subjected to a load, there will be contact over a larger part of the adjacent portions of the roller and race, but in either case ample clearance is provided at and toward both ends of the rollers.

This application is a continuation in part of my copending application entitled "Roller bearing", Serial No. 161,719, filed April 13, 1917.

The rollers 4' are all symmetrical in form and are not provided with flattened portions, or similar expedients, for assembly purposes, assembly and disassembly being readily performed by tilting the spherical inner race member. When the inner member 3 is tilted somewhat past the position shown in dotted lines in Fig. 2, one or more of the rollers 4' may be removed at about the top or bottom of the bearing, as the parts are shown in the drawings. Upon bringing the space or spaces without a roller around into register with the relatively tipped over inner bearing member, the latter is freed and can readily be removed. Assembly is made in reverse order from that just described. While the rollers are preferably concaved on the arc of a circle, it is to be understood that other curvatures than the arc of a circle may be resorted to, if desired, both for the rollers and for the bearing surface of the outer race member, so long as the rollers are formed on a larger curvature than the curvature of the race members, thereby securing substantially point contact between the rollers and the bearing surfaces of the race members.

While I have described a specific form of my invention, changes may be resorted to within the scope of my claim without departing from the principle of my invention.

I claim:

A bearing comprising an outer race member having a transversely curved inwardly convexed bearing surface, an inner race member having a spherical bearing surface, and a series of rollers between said race members, said rollers having their axes parallel to one another and having their bearing surfaces longitudinally concaved on a curvature larger than the curvatures of the bearing surfaces of the race members and making substantially point contact with said bearing surfaces of the race members when not under load, and all of said rollers being completely symmetrical in form at and to a substantial distance on each side of the portion thereof of smallest diameter.

In testimony that I claim the foregoing, I have hereunto set my hand this 5 day of June, 1919.

PERCY A. E. ARMSTRONG.